(12) United States Patent
Yamada

(10) Patent No.: US 10,310,775 B2
(45) Date of Patent: Jun. 4, 2019

(54) JOB PROCESSING APPARATUS, METHOD OF CONTROLLING JOB PROCESSING APPARATUS, AND RECORDING MEDIUM FOR AUDIO GUIDANCE

(71) Applicant: CANON KABUSHIKI KAISHA, Tokyo (JP)

(72) Inventor: Masayuki Yamada, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/924,855

(22) Filed: Mar. 19, 2018

(65) Prior Publication Data

US 2018/0285028 A1 Oct. 4, 2018

(30) Foreign Application Priority Data

Mar. 31, 2017 (JP) ................................ 2017-072920

(51) Int. Cl.
  *G06F 3/12* (2006.01)
  *G06F 3/041* (2006.01)
  *G06F 3/023* (2006.01)
  *G06F 3/16* (2006.01)

(52) U.S. Cl.
  CPC ............ *G06F 3/1204* (2013.01); *G06F 3/023* (2013.01); *G06F 3/0416* (2013.01); *G06F 3/1206* (2013.01); *G06F 3/167* (2013.01)

(58) Field of Classification Search
  None
  See application file for complete search history.

(56) References Cited

U.S. PATENT DOCUMENTS

| 8,166,395 B2* | 4/2012 | Omi | G06F 3/04895 |
| | | | 715/705 |
| 8,723,805 B2* | 5/2014 | Ikegawa | G06F 3/04886 |
| | | | 345/173 |
| 2006/0242331 A1* | 10/2006 | Yamada | G06F 1/24 |
| | | | 710/5 |
| 2008/0065391 A1* | 3/2008 | Omi | H04N 1/00405 |
| | | | 704/275 |
| 2011/0074687 A1* | 3/2011 | Takaoka | G06F 3/0233 |
| | | | 345/168 |

(Continued)

FOREIGN PATENT DOCUMENTS

JP 2006031273 A 2/2006

*Primary Examiner* — Dung D Tran
(74) *Attorney, Agent, or Firm* — Canon U.S.A., Inc. IP Division

(57) ABSTRACT

A job processing apparatus includes a hardware numeric keypad including a first hardware key and a second hardware key and includes a display unit configured to display a plurality of software keys that accepts an operation which processes a job. The job processing apparatus further includes a first control unit and a second control unit. The first control unit moves a focus by the first hardware key being pressed in an audio mode in which audio guidance in accordance with a position of the focus displayed in the display unit is provided. The second control unit performs processing based on one of the plurality of software keys aligned with the focus by the second hardware key being pressed in the audio mode. Where the second hardware key is pressed while the focus is not aligned with the software key, the second control unit starts processing of the job.

13 Claims, 12 Drawing Sheets

(56) References Cited

U.S. PATENT DOCUMENTS

2014/0292691 A1* 10/2014 Sugiyama .............. G06F 3/016
  345/173
2016/0105576 A1* 4/2016 Osawa .............. H04N 1/00488
  358/1.15

* cited by examiner

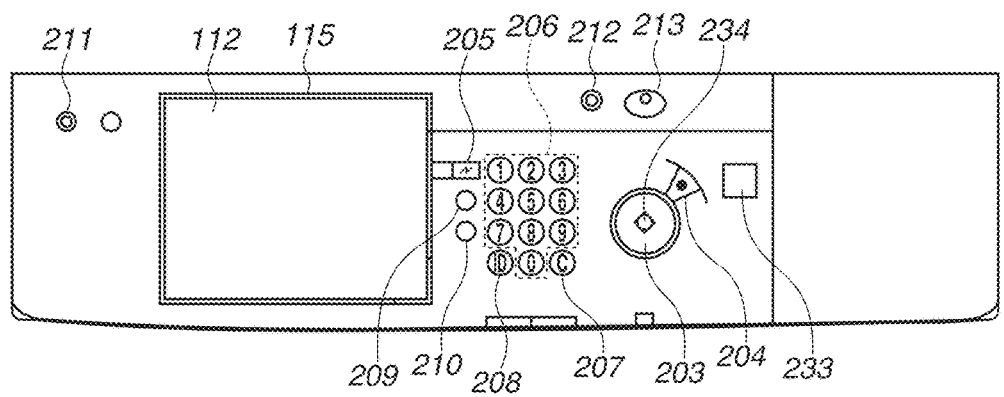
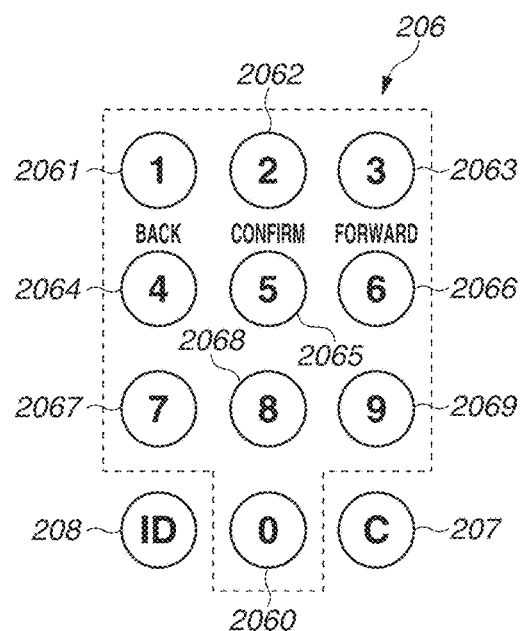

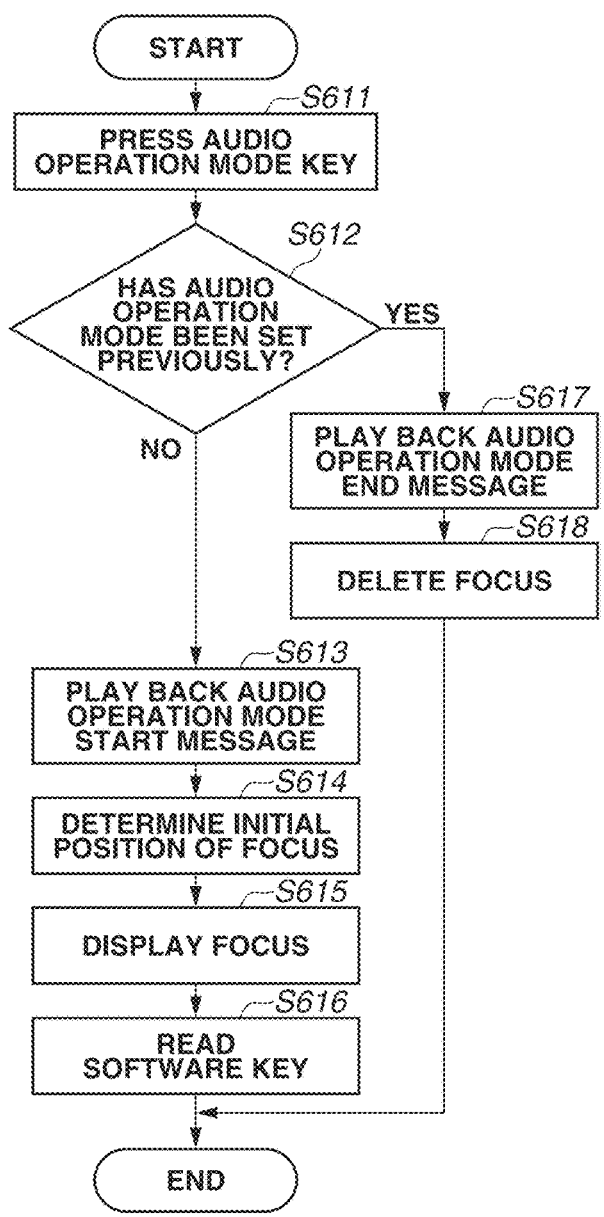
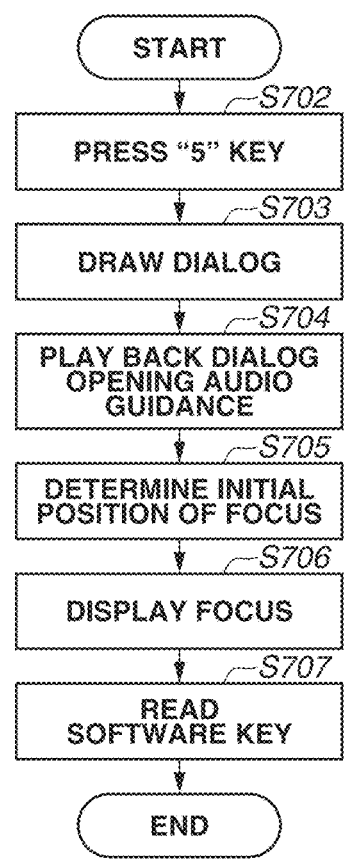

FIG.10A

| FOCUS POSITION | SOFTWARE KEYS DISPLAYED IN DIALOG |
|---|---|
| COLOR SELECTION | AUTO COLOR, FULL COLOR, MONOCHROME, SINGLE COLOR, TWO COLORS, OK, CANCEL |
| MAGNIFICATION SETTING | AUTO MAGNIFICATION, 400%, 200%, 141%, 122%, 115%, ACTUAL SIZE, 88%, 81%, 70%, ... |
| PAPER SELECTION | AUTO, CASSETTE 1, CASSETTE 2, CASSETTE 3, CASSETTE 4, CASSETTE 5, OK, CANCEL |
| ⋮ | ⋮ |
| DIALOG (512) | COLOR SELECTION, MAGNIFICATION, (PARTIALLY OMITTED), DOCUMENT TYPE, NUMBER OF COPIES |
| DIALOG (501) | |
| MESSAGE FIELD | |

| DIALOG (512) | PROCESSING CONTENT |
|---|---|
| DIALOG (511) | START |
| MESSAGE FIELD | RESET |
| DETAILED DIALOG OF COLOR SELECTION | RESET |
| DETAILED DIALOG OF MAGNIFICATION SETTING | RESET |
| ⋮ | ⋮ |

FIG.10C

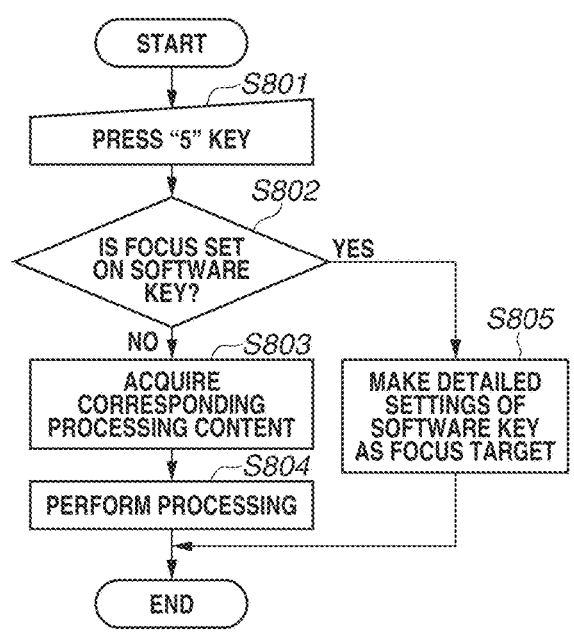

JOB PROCESSING APPARATUS, METHOD OF CONTROLLING JOB PROCESSING APPARATUS, AND RECORDING MEDIUM FOR AUDIO GUIDANCE

BACKGROUND OF THE INVENTION

Field of the Invention

The present disclosure relates to a job processing apparatus, a method of controlling the job processing apparatus, and a recording medium.

Description of the Related Art

In job processing apparatuses such as multi-function peripherals (MFP), there is technology that assists users' operation through audio guidance so that visually impaired users can easily use such apparatuses.

Japanese Patent Application Laid-Open No. 2006-031273 discusses an information input apparatus having a focus display mode in which operation assistance through audio guidance is provided and a normal mode in which no operation assistance through audio guidance is provided. In the focus display mode, a function of a cursor key to move the focus is assigned to a numeric keypad to allow a user to set the focus on a software key to be selected from among a plurality of software keys displayed in a display unit. Then, an information processing apparatus reads the function of the focused software key.

SUMMARY OF THE INVENTION

According to an aspect of the present invention, a job processing apparatus, having a hardware numeric keypad including a first hardware key and a second hardware key and having a display unit configured to display a plurality of software keys that accepts an operation which processes a job, includes a first control unit configured to move a focus by the first hardware key being pressed in an audio mode in which audio guidance in accordance with a position of the focus displayed in the display unit is provided, and a second control unit configured to perform processing based on one of the plurality of software keys aligned with the focus by the second hardware key being pressed in the audio mode, wherein, in a case where the second hardware key is pressed while the focus is not aligned with the software key, the second control unit starts processing of the job.

Further features of the present invention will become apparent from the following description of embodiments with reference to the attached drawings.

BRIEF DESCRIPTION OF THE DRAWINGS

FIGS. 3A and 3B are views illustrating an appearance configuration of an operation unit.

FIGS. 6A and 6B are a flowchart when the image processing apparatus is set to the audio mode or the normal mode and a flowchart when advanced settings of software keys are made, respectively.

FIGS. 10A, 10B, and 10C are a focus movement table, a correspondence table between a dialog on which the focus is to be set and processing contents, and a flowchart of processing corresponding to the dialog on which the focus is to be set, respectively.

DESCRIPTION OF THE EMBODIMENTS

Figure 1:
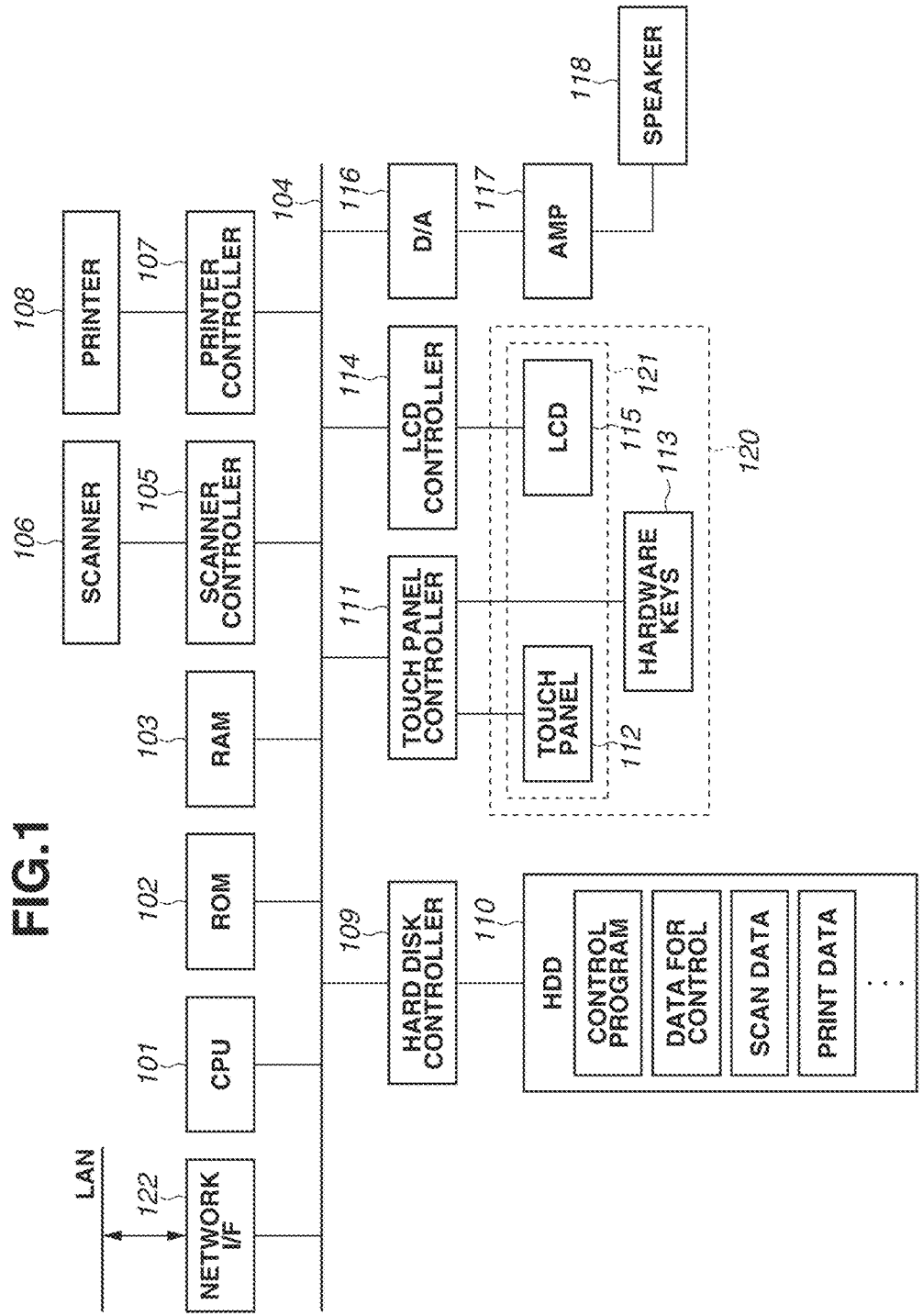
FIG. 1 is a diagram illustrating a hardware configuration of an image processing apparatus.

FIG. 1 is a diagram illustrating a hardware configuration of an image processing apparatus included in a job processing apparatus. The image processing apparatus in the present embodiment is a multi-function peripheral (MFP) including functions of, for example, a copy function, a print function, and a scan/send function. The image processing apparatus includes a scanner 106 and a printer 108.

A central processing unit (CPU) 101 controls the image processing apparatus as a whole. The CPU 101 is connected to each unit by a bus 104 such as a data bus. A read only memory (ROM) 102 stores fixed programs such as a boot program and a basic input/output system (BIOS), and data. A random access memory (RAM) 103 functions as a main memory and also as a work memory that provides a work area for the CPU 101 to execute processing. The RAM 103 is also used to temporarily store image data generated by scanning using the scanner 106.

A scanner controller 105 controls an operation of the scanner 106 in accordance with setting contents by an operation unit 120 described below. The scanner 106 scans a document of paper or the like using an optical reading apparatus such as a charge coupled device (CCD) and converts an image of the document into electric signal data.

A printer controller 107 controls the printer 108 in accordance with setting contents by the operation unit 120 to cause the printer 108 to perform a printing operation. The printer 108 prints an image based on image data on a sheet. As a method of printing, an electrophotographic method includes using a photosensitive drum, a photosensitive belt and the like, and an inkjet method includes directly printing an image on a sheet by discharging ink from a minute nozzle array.

A hard disk controller 109 controls a hard disk drive (HDD) 110, as an example of a storage device, to store various kinds of data in the HDD 110 or to acquire stored data. The HDD 110 is a storage unit and stores a control program and control data to control the whole system, image data, and print data.

A network interface (I/F) 122 is connected to a local area network (LAN) to input and output data. Incidentally, a modem (not illustrated) can be connected to the public network to input and output data like transmission and reception of FAX.

The operation unit 120 has a configuration including, as illustrated in FIG. 1, a display unit 121 and keys (hereinafter, hardware keys 113) constructed of hardware. The display unit 121 has a configuration including a touch panel 112 and a liquid crystal display (LCD) 115 as an example of a display device.

The touch panel 112 is arranged on a display plane of the LCD 115. The touch panel 112 displays a plurality of touch panel keys (hereinafter, software keys) as virtual keys displayed on the LCD 115. When the user touches a software key, the touch panel 112 detects coordinates of such touched position. Based on the coordinates of the position, the CPU 101 determines which virtual key on the LCD 115 the user has attempted to press. Meanwhile, the hardware keys 113 are mechanically configured to provide an operation feeling to the user. More specifically, the hardware keys are keys 203 to 211 and 233 described below in FIGS. 3A and 3B.

A touch panel controller 111 conveys, to the CPU 101, operating instructions of the user input via the touch panel 112. Also, an LCD controller 114 controls the LCD 115 to display a setting operation screen.

The image processing apparatus in the present embodiment further includes a digital-analog (D/A) converter 116, a power amplifier 117, and a speaker 118. Audio waveform data is created by an operation of the control program based on text data and phoneme data, and the speaker 118 can be caused to output audio via the D/A converter 116 and the power amplifier 117.

The image processing apparatus executes jobs such as a printing job that prints an image by the printer 108 based on image data of a document read by the scanner 106 and a reading job that sends image data of a document read by the scanner 106 via a LAN.

Figure 2:
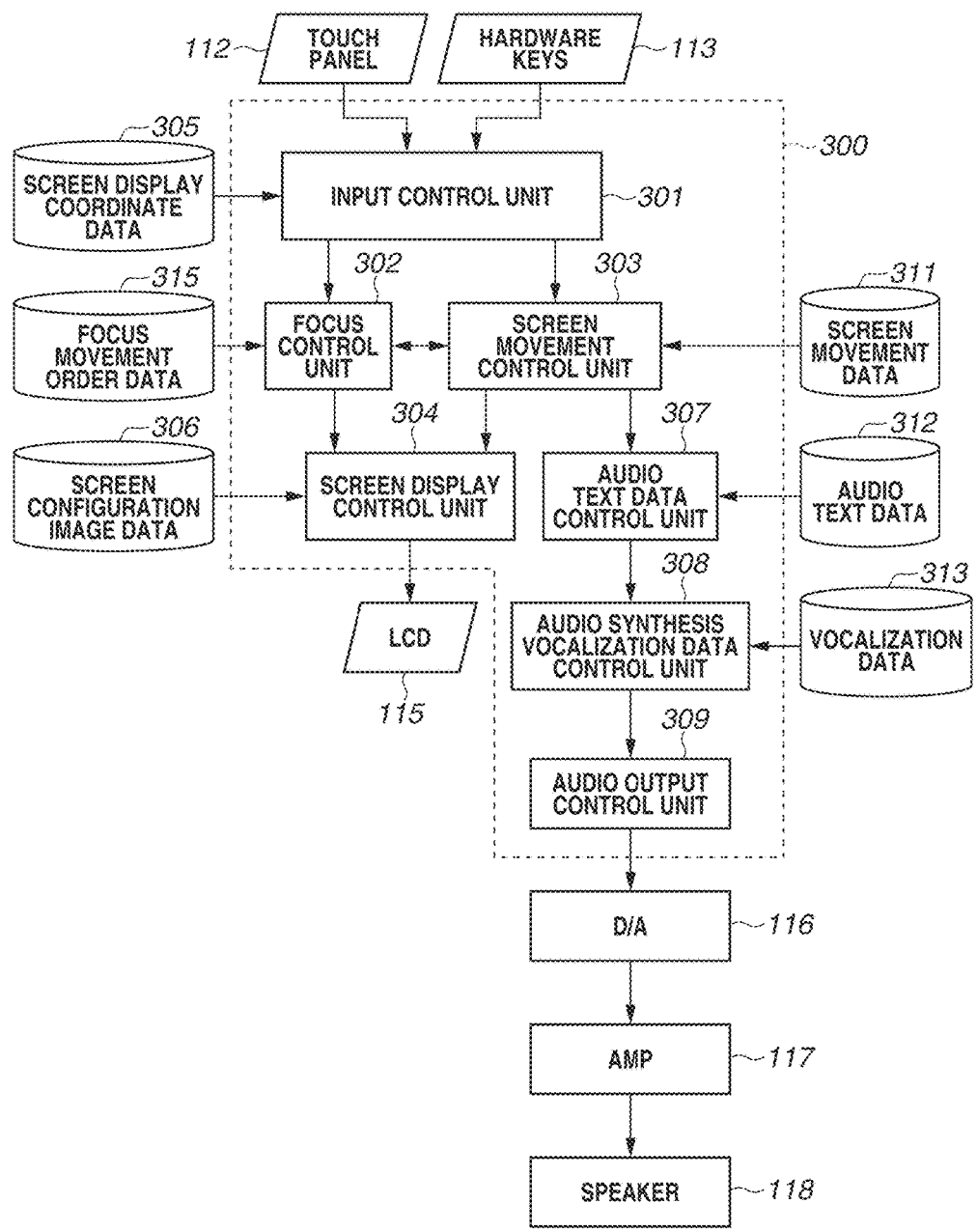
FIG. 2 is a diagram illustrating a functional configuration of the image processing apparatus.

FIG. 2 is a diagram illustrating a functional configuration of the image processing apparatus in the present embodiment. A function of each control unit surrounded by a broken line 300 is implemented by the control program stored in the HDD 110. Also, various data used to implement functions described below are held by the HDD 110 or the RAM 103.

An input control unit 301 detects a user input from the touch panel 112 or the hardware keys 113 and determines which software key or hardware key the user has operated, based on screen display coordinate data 305. The determination result is sent to a focus control unit 302 and a screen movement control unit 303.

The focus control unit 302 controls focus indicating which of a plurality of software keys displayed on the LCD 115 is to be operated. More specifically, the focus control unit 302 stores on which key the focus is set, and controls the movement and the like of the focus based on data of focus movement order data 315. The focus control unit 302 notifies a screen display control unit 304 on which key the focus is set.

When a key is actually pressed, the screen movement control unit 303 controls movement to a dialog or a screen to be displayed next based on screen movement data 311. Setting values about the movement of screens and a mode setting as to whether to make a focus display are also stored in the screen movement control unit 303.

The screen movement control unit 303 notifies the focus control unit 302, the screen display control unit 304, and an audio text data control unit 307 of displayed screen information. The screen movement control unit 303 further notifies the focus control unit 302 and the audio text data control unit 307 of information indicating whether a mode of making a focus display is set.

The screen display control unit 304 creates image data of a screen actually displayed on the LCD 115 based on data regarding a screen from the screen movement control unit 303 and screen configuration image data 306. Also, the focus is drawn on a specified key arranged on the screen based on data from the focus control unit 302, if necessary. The screen display control unit 304 further causes the LCD 115 to draw image data of a screen.

The audio text data control unit 307 obtains screen movement information from the screen movement control unit 303 and audio text data 312 associated with each screen and keys. Then, if any screen movement or focus movement occurs in response to an operation input by the user, audio read text data suitable as an explanation thereof is obtained from the audio text data 312. Then, the audio text data control unit 307 delivers the obtained audio text data to an audio synthesis vocalization data control unit 308.

The audio synthesis vocalization data control unit 308 creates audio waveform data by audio synthesis based on input audio text data and vocalization data 313 for each phoneme and delivers the audio waveform data to an audio output control unit 309.

The audio output control unit 309 outputs the received audio waveform data to the D/A converter 116. Accordingly, the audio waveform data is D/A-converted by the D/A converter 116 and amplified by the power amplifier 117 before being output by the speaker 118.

FIG. 3A is a view illustrating an appearance configuration of the operation unit 120 in the present embodiment. In FIG. 3A, the touch panel 112 is provided while being overlaid on the LCD 115. The LCD 115 displays the operation screen of the system and the software keys and, when a software key is pressed, the touch panel 112 conveys position information thereof to the CPU 101.

The hardware keys 113 include the keys 203 to 211 and 233, and respective concrete functions are as described below.

A start key 203 is used when a reading operation of an original image by the scanner 106 or a printing operation by the printer 108 starts. A stop key 204 works to stop a running operation.

A two-color lamp 234 is arranged in the center of the start key 203 to indicate whether the start key 203 is enabled or disabled. That the start key 203 is enabled refers to a state in which execution instructions of a job can be issued by the start key 203. That the start key 203 is disabled refers to a state in which execution instructions of a job cannot be issued by the start key 203. More specifically, for example, the start key 203 is enabled when the two-color lamp 234 is lit in green and the start key 203 is disabled when the two-color lamp 234 is lit in red.

A reset key 205 is used to initialize settings. A hardware numeric keypad 206 is used when a numeric value is input such as when the number of copies is set. A clear key 207 is used when an input numeric value should be cleared. A guide key 209 is used when help other than key functions about settings or the input method is displayed.

An audio mode key 233 is used to start or terminate an audio mode. The audio mode is a mode in which guidance to assist in operations is provided by audio. A mode in which guidance to assist in operation is not provided by audio is defined as a normal mode. The CPU 101 switches the image processing apparatus from the normal mode to the audio mode by the audio mode key 233 being pressed during the normal mode. Also, the CPU 101 switches the image processing apparatus from the audio mode to the normal mode by the audio mode key 233 being pressed during the audio mode.

An identification (ID) key 208 is used to input a user ID. A user mode key 210 is used to make special settings or detailed settings for an operation of the image processing apparatus. A counter key 211 is used to check the number of sheets printed by the image processing apparatus. A power saving key 212 is used to reduce power consumption by putting the image processing apparatus into a standby state. A power key 213 is used to turn on or turn off power of the apparatus.

FIG. 3A illustrates a configuration in which the audio mode key 233 is arranged, but the audio mode key 233 may not be arranged. In that case, for example, the normal mode and the audio mode are switched by long-pressing of the ID key 208 or the reset key 205.

FIG. 3B is a view illustrating the hardware numeric keypad 206 in detail. The hardware numeric keypad 206 includes ten independent hardware keys 2060 to 2069. Each key is associated with text or a symbol (one of numbers 0 to 9 in the illustrated example). The user can input a number using these keys. A physical protrusion is present on a surface of the "5" key 2065 positioned almost at the center of the numeric keypad. With this physical protrusion and a general array of keys, visually impaired users can easily find and handle the numeric keypad while relying on a tactile sense.

Figure 4A:
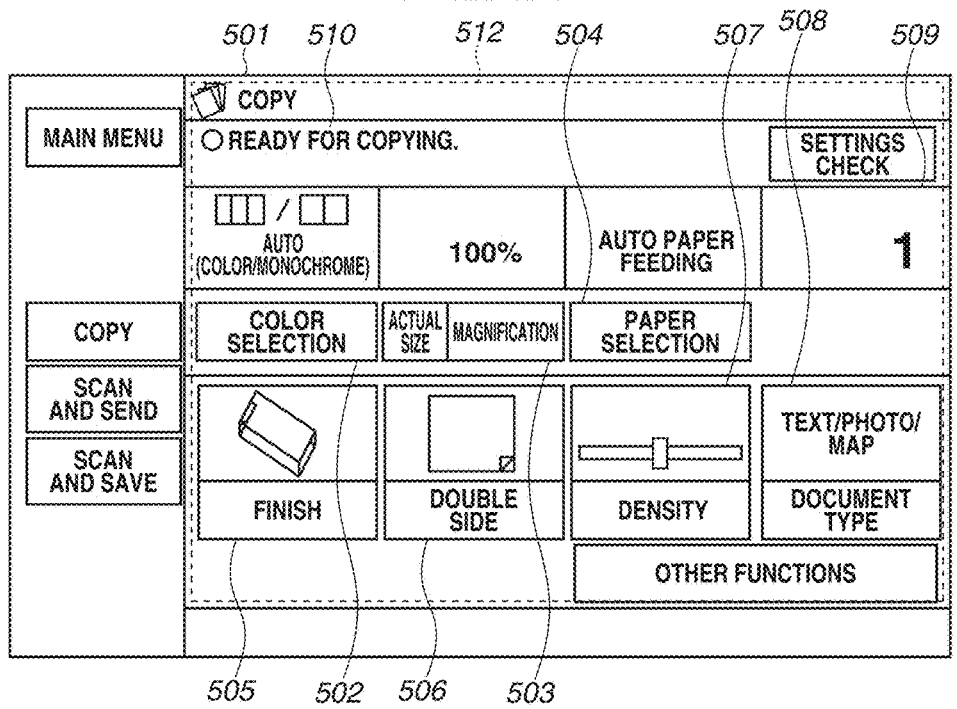
FIGS. 4A, 4B, and 4C are diagrams illustrating an operation screen in a normal mode, a determination flowchart to determine whether ready for copying, and a flowchart of copying in the normal mode, respectively.
Figure 4B:
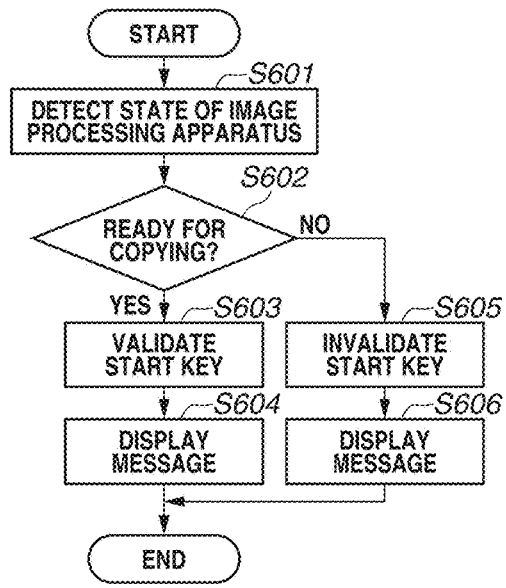
Figure 4C:
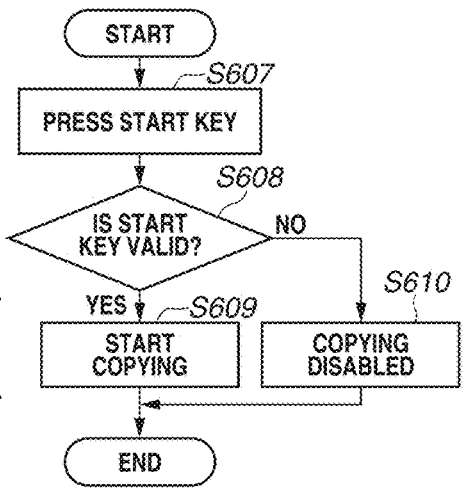

FIG. 4A illustrates an example of the operation screen in the normal mode of the present embodiment, and FIGS. 4B and 4C illustrate examples of a flowchart of copying. FIG. 4A is the operation screen of the image processing apparatus when copying is done in the normal mode.

A dialog 501 is a screen displayed in the display unit 121. The dialog 501 is a foundation of other parts and a dialog 512 is displayed on the dialog 501. Each software key is displayed on the dialog 512. When the user presses a software key, the image processing apparatus operates in accordance with the function set to the corresponding software key.

A term, "press" used herein means pressing an area on the touch panel 112 in an area of the display unit 121 where the software keys are displayed. Here, a case where the touch panel is a pressure sensitive touch panel is illustrated, but "press" is replaced by "touch" for an electrostatic touch panel. The software keys are illustrated in different forms between a pressed state and a non-pressed state. For example, a software key in a non-pressed state is displayed so as to have a protruding visual effect and a software key in a pressed state is displayed so as to have a recessed visual effect. Alternatively, a software key in a pressed state can be displayed in black or white in a reversed manner from a non-pressed state.

The function of each software key will be described. A color selection key (hereinafter, the color selection) 502 is a software key to set the color selection for copying. When the user presses the color selection 502, a detailed dialog (not illustrated) for color selection settings opens so that settings such as the selection of color copying or monochrome copying can be made.

A magnification key (hereinafter, the magnification) 503 is a key to make magnification settings. When the user presses the magnification 503, a detailed dialog (not illustrated) for magnification settings opens so that the magnification of an enlarged copy, a reduced copy or the like can be set.

A paper selection key (hereinafter, the paper selection) 504 is a key to make paper selection settings. When the user presses the paper selection 504, a detailed dialog (not illustrated) for paper selection settings opens so that paper used for copying can be set.

A finish key (hereinafter, the finish) 505 is a key to make finish settings. When the user presses the finish 505, a detailed dialog (not illustrated) for finish settings opens so that finish settings such as folding, sorting, and stapling settings can be made.

A double side key (hereinafter, the double side) 506 is a key to make double side settings. When the user presses the double side 506, a detailed dialog (not illustrated) for double side settings opens so that settings of double side copying can be made.

A density key (hereinafter, the density) 507 is a key to make density settings. When the user presses the density 507, a detailed dialog (not illustrated) for density settings opens so that the density of copying can be set.

A document type key (hereinafter, the document type) 508 is a key to make document type settings. When the user presses the document type 508, a detailed dialog (not illustrated) for document type settings opens so that the document type can be set.

A number of copies input field 509 is an area called a numeric value input field. When the user inputs a numeric value by operating the hardware numeric keypad 206, the input numeric value is displayed in the number of copies input field 509. The number of copies input field 509 is a field to input the number of copies and as many images as the number of copies input by the user are printed out.

A message field 510 is an area called a text field or text. Display contents of the message field 510 are controlled by a program that controls the MFP. The message field is an area that presents information to the user. In the message field 510, for example, the status of the image processing apparatus or instructions to the user such as "Copying is ready." and "Set your document again." are displayed.

The screen display illustrated in FIG. 4A indicates a state in which no error has occurred. The start key 203 is enabled due to the lack of an internal error, for example, and when the start key 203 is pressed, the image processing apparatus starts copying. On the other hand, when some error such as no paper occurs, the start key 203 is disabled and the image processing apparatus does not start copying even if the user presses the start key 203 in this state.

A determination flowchart of determining whether the image processing apparatus is ready for copying will be described using FIG. 4B.

First, in step S601, the CPU 101 detects the status of the image processing apparatus. The status of the image processing apparatus is determined based on detection values of various sensors (not illustrated) mounted on the image processing apparatus. Examples of what is detected by various sensors include whether any document is placed on a document positioning plate of the scanner 106 and states of consumable products such as toner and a drum lifetime of the printer 108. Also, setting values input by the user through the operation unit 120 partially constitute the status of the image processing apparatus. More specifically, these setting values include settings related to printing such as the color setting and density setting for printing, and settings such as the number of copies.

In step S602, the CPU 101 determines whether copying is ready. In a case where the status of the image processing apparatus detected in step S601 is an internal error (for example, "no toner", "expired service life of drum", or "no paper of the size set by the user"), copying is determined not to be ready (NO in step S602), and the processing proceeds to step S605. On the other hand, in a case where, as a result of the determination, the status of the image processing apparatus detected in step S601 is normal (YES in step S602), copying is determined to be ready and the processing proceeds to step S603.

In step S603, the CPU 101 enables the start key 203 and lights up the two-color lamp 234 in green. In step S604, the CPU 101 displays, in the message field 510, contents (for example, "Copying is ready.") in accordance with the status of the image processing apparatus. After step S604, the flowchart in FIG. 4B ends.

In step S605, the CPU 101 disables the start key 203 and lights up the two-color lamp 234 in red. In step S606, the CPU 101 displays, in the message field 510, contents (for example, "no paper") in accordance with the status of the image processing apparatus. After step S606, the flowchart in FIG. 4B ends.

A flowchart of copying in the normal mode will be described using FIG. 4C. In step S607, the CPU 101 detects that the start key 203 has been pressed by the user.

In step S608, the CPU 101 determines whether acceptance of a copy start instruction by the start key 203 being pressed is enabled or disabled. At this point, the CPU 101 refers to the result of the flowchart performed in FIG. 4B. In a case where, as a result of the determination, the start key 203 is enabled (YES in step S608), the processing proceeds to step S609, and in a case where the start key 203 is disabled (NO in step S608), the processing proceeds to step S610.

In step S609, the CPU 101 issues an instruction to start copying to the scanner controller 105 and the printer controller 107. At this point, a document is read by the scanner 106 and image data of the read document is generated before the generated image data is printed by the printer 108. When step S609 is finished, the flowchart ends.

In step S610, the CPU 101 does not start copying. At this point, contents in accordance with the status of the apparatus like, for example, "Copying is not ready." are displayed in the message field. Incidentally, the display of the message field in step S610 can remain the display of the message displayed in step S606. After step S610, the flowchart ends.

Figure 5A:
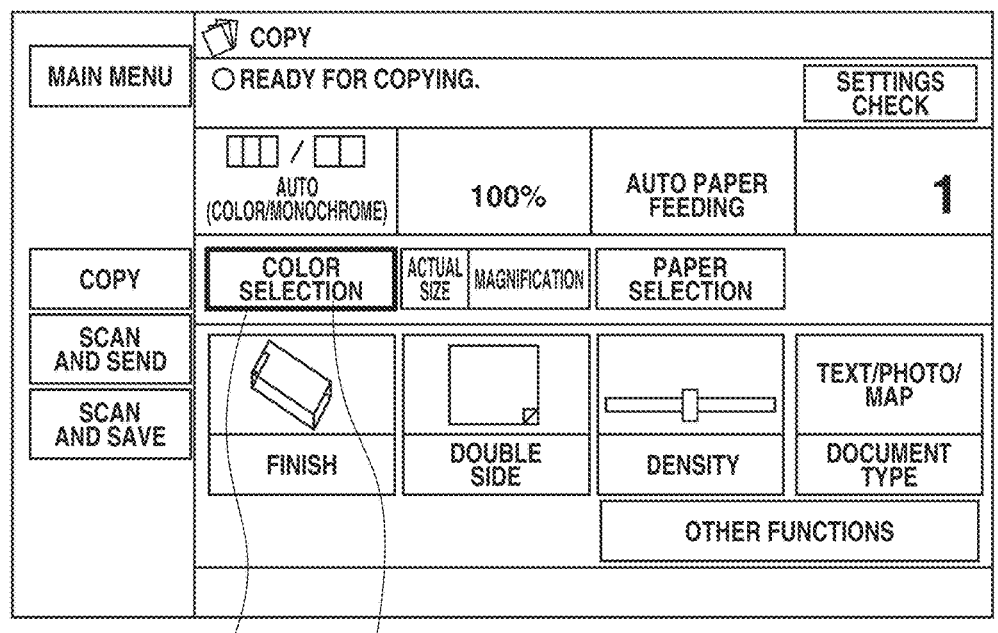
FIGS. 5A and 5B are the operation screen in an audio mode and a focus movement table, respectively.
Figure 5B:
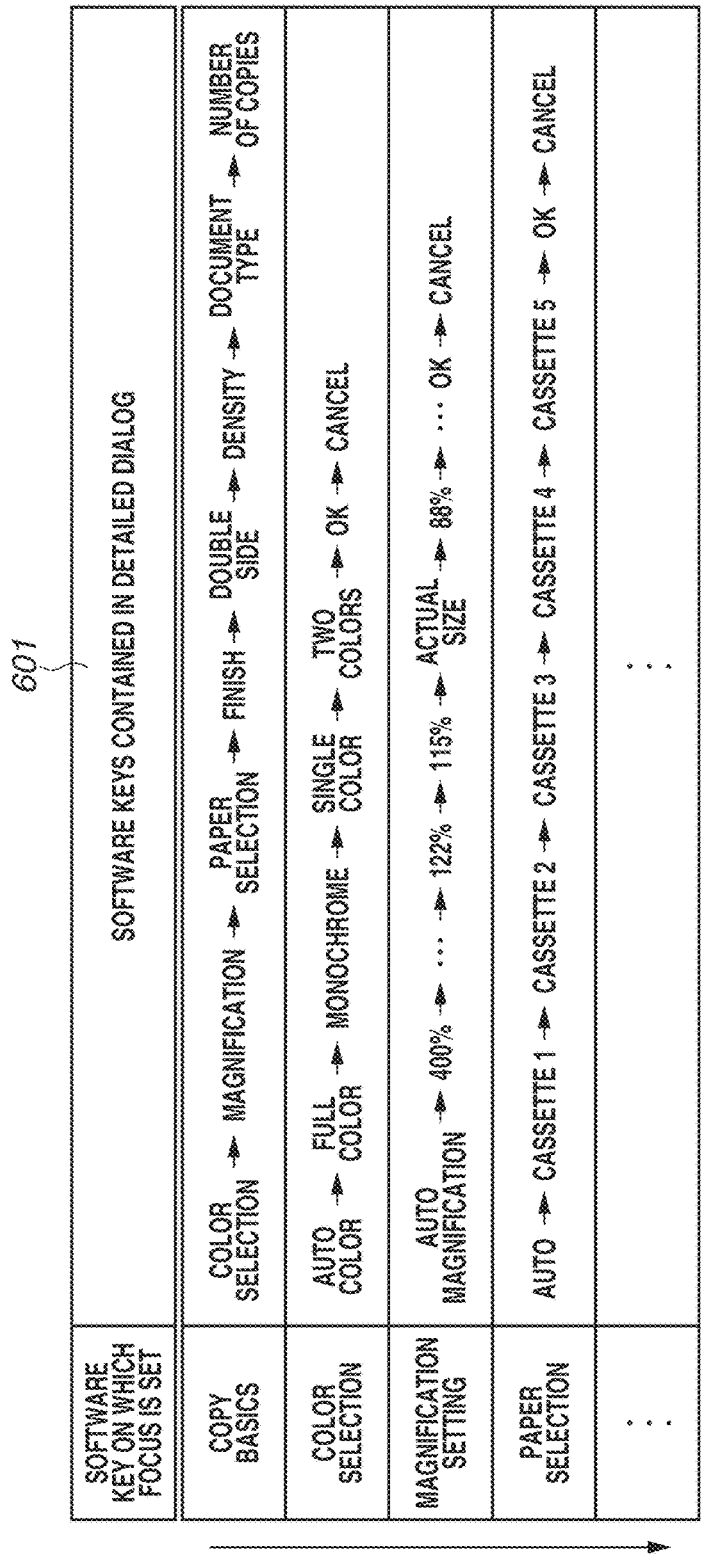

An example of the operation screen in the audio mode of the present embodiment and an example of a focus movement table are illustrated in FIGS. 5A and 5B.

If the user presses the audio mode key 233 in the state of FIG. 4A, the audio mode starts and the state of FIG. 5A is created. FIG. 5A is an example of the operation unit 120 of the image processing apparatus when copying is to be done in the audio mode. In the audio mode in the present embodiment, the user operates the MFP using "focus". The focus moves to one of a plurality of software keys displayed in the display unit 121 and non-operation units by a user's operation.

FIG. 5A is a screen, as an example, when the position of a focus 521 is aligned with the color selection 502. Here, the color selection 502 is highlighted by the focus 521 being superimposed thereon, but the method of displaying focus is not limited to this example. For example, the color of an outer frame of a target software key can be changed, the color of the target software key can be changed, or the shape of the outer frame of the target software key can be changed. Also, the focus may not be visually displayed. For example, a change of the position of focus is stored inside the apparatus so that the display on the display unit 121 may not be changed.

The movement of focus will be described using FIG. 5B. FIG. 5B schematically illustrates an example of the focus movement table used in the present embodiment. A focus movement table 601 illustrates order in which the focus moves and the software keys contained in a detailed dialog newly opened to make detailed settings when a software key aligned with the focus is pressed. Also, order in which the position of the focus moves on the software keys contained in a detailed dialog newly opened is illustrated.

Here, only the first line and the second line will be described. The focus movement table 601 is held in the ROM 102 or the HDD 110 and is read by the RAM 103 during execution of a program. The first column (the column of "software key on which focus is set") of the focus movement table 601 is the identifier of a dialog. Each row of the focus movement table 601 illustrates focus movement order of the dialog illustrated in the first column.

The second column (the column of "software keys contained in detailed dialog") of the focus movement table 601 lists identifiers of the software keys in the dialog written in the first column to illustrate the focus movement order.

For example, the first row of the focus movement table 601 illustrates the focus movement order in the dialog 512. That is, in the dialog 512, the focus moves in the order of "color selection"→"magnification"→"paper selection"→ . . . . Further, if, for example, the software key of the focused "color selection" is pressed, a detailed dialog of the color selection 502 in the second column opens and, in the detailed dialog of the color selection 502, the position of the focus moves in the order of "auto color"→"full color"→ . . . .

A flowchart when the image processing apparatus is set to the audio mode or the normal mode will be described using FIG. 6A.

In step S611, the CPU 101 detects that the audio mode key 233 has been pressed by the user.

In step S612, the CPU 101 determines whether the state before step S611 is the audio mode or the normal mode. In a case where the state before step S611 is the audio mode (YES in step S612), the processing proceeds to step S617. In a case where the state before step S611 is the normal mode (NO in step S612), the processing proceeds to step S613.

In step S617, the CPU 101 changes the settings from the audio mode to the normal mode. In this case, the CPU 101 outputs a message indicating that the audio mode ends through the audio output control unit 309 from the speaker 118. The message indicating that the audio mode ends can be an audio message recorded in advance, or audio waveform data can be created by the audio synthesis vocalization data control unit 308 based on audio text data acquired from the audio text data 312. Alternatively, the message can be a beep sound or sound data.

In step S618, the CPU 101 deletes the display of the focus 521. At this point, if, for example, the display of the focus 521 is expressed by a change in the display form of the software keys, the software keys are brought back to the normal display form. When step S618 is finished, the normal mode is set.

In step S613, the CPU 101 changes the settings from the normal mode to the audio mode. Then, in step S613, the CPU 101 outputs a message indicating that the audio mode starts through the audio output control unit 309 from the speaker 118. The message indicating that the audio mode starts can be an audio message recorded in advance, or audio waveform data can be created by the audio synthesis vocalization data control unit 308 based on audio text data acquired from the audio text data 312. Alternatively, the message can be a beep sound or sound data.

In step S614, the focus is set on a predetermined software key set at an initial position where the focus is initially displayed. Hereinafter, the focus movement table 601 described with reference to FIG. 5B is used to provide a description. According to the focus movement table 601 in FIG. 5B, the initial position becomes the color selection 502.

In step S615, the CPU 101 displays, as illustrated in FIG. 5A, the focus 521 in the color selection 502. In step S616, the speaker 118 makes an audio notification about the color selection 502. The contents of notification can be only the name of the color selection 502 or can include description of the function thereof. For example, the speaker 118 outputs an audio message like "The color selection key, you will select the color mode".

When step S616 is finished, audio guidance for the initial focus position ends. In S616 and thereafter, each time the position of the focus is instructed to change, the movement of the focus and reading of the function of the newly focused software key are repeated. The method of changing the focus position will be described with reference to FIGS. 9A and 9B described below.

A flowchart when detailed settings of the software keys are made will be described using FIG. 6B. In FIG. 6B, a case where the "5" key 2065 is pressed while the position of the focus 521 is aligned with the color selection 502 will be described. The flowchart in FIG. 6B is a flowchart after the processing of step S616 in FIG. 6A. There is no need to wait for the end of reading of the software key in step S616 and processing illustrated in the flowchart of FIG. 6B can be performed in parallel during the process of reading the software key.

In step S702, when the "5" key 2065 is pressed, the CPU 101 starts to make detailed settings of the color selection 502.

In step S703, the CPU 101 causes the LCD 115 to display a detailed dialog (not illustrated) to make detailed settings of the color selection 502. Then, the CPU 101 displays, in the detailed dialog, each software key (auto color, full color, monochrome, single color, two colors, an OK key, and a cancel key) illustrated as examples in the table of FIG. 5B.

In step S704, the CPU 101 outputs, from the speaker 118, audio guidance when the dialog opens. More specifically, the name of the detailed dialog of which software key is preferably guided by voice like, for example, "This is a detailed setting screen of the color selection".

In step S705, the CPU 101 aligns the focus with the initial focus position of the software keys displayed in the dialog opened in step S704. The processing of step S705 is similar to that of step S614. More specifically, as illustrated in FIG. 5B, the focus is set on the software key of "auto color".

In step S706 and step S707, the CPU 101 performs processing similar to that of step S615 and step S616 in FIG. 6A and makes detailed settings as in step S702 after the "5" key 2065 is pressed.

When step S707 is finished, the audio guidance output when the focus is aligned with the initial position of the detailed dialog ends. Incidentally, each time the position of the focus is changed, steps S705 to S707 are repeated and the detailed dialog is closed when detailed settings are finished. The method of changing the focus position will be described with reference to FIGS. 9A and 9B described below.

Figure 7A:
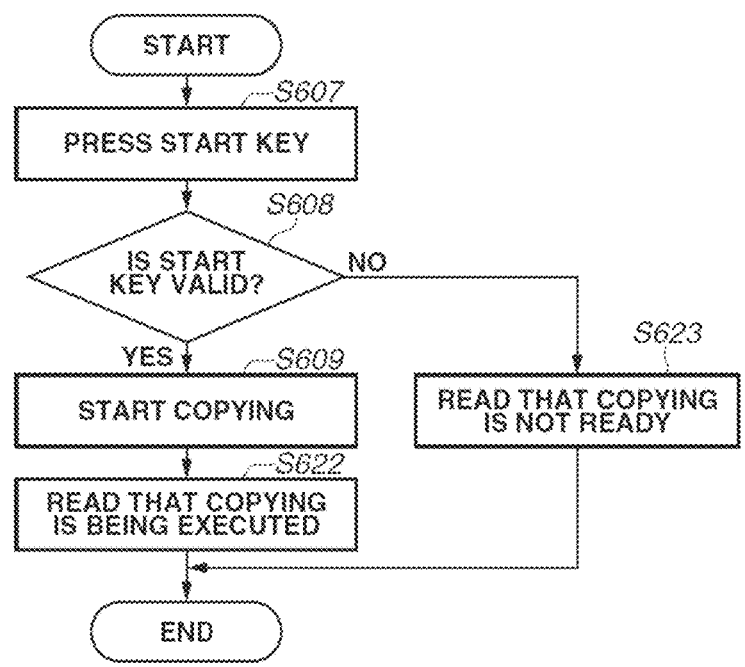
FIGS. 7A and 7B are a flowchart of copying in a conventional audio mode and an operation screen illustrating a conventional issue, respectively.
Figure 7B:
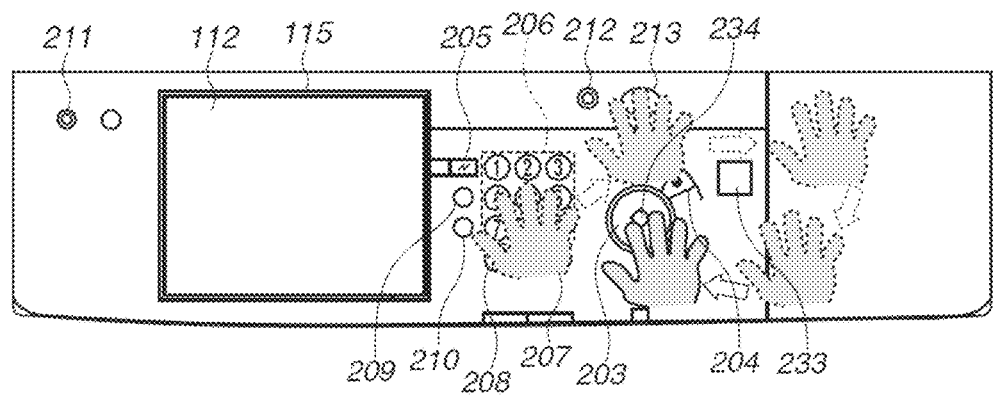

A flowchart when copying is executed in a conventional audio mode and an example of the operation unit illustrating a conventional issue will be described using FIGS. 7A and 7B.

Steps S607 to S609 are similar to those in FIG. 4C and thus, the description thereof is omitted.

In step S622, the CPU 101 provides audio guidance indicating that copying is being executed via the speaker 118. For example, audio content like "Copying is being executed." is output from the speaker 118. When step S622 is finished, the flowchart in FIG. 7A ends.

In step S623, the CPU 101 does not issue instructions to start copying. Then, the CPU 101 provides audio guidance indicating that copying cannot start via the speaker 118. For example, audio content like "Copying is not ready." is output from the speaker 118. When step S623 is finished, the flowchart in FIG. 7A ends.

Thus, the start of copying is conventionally instructed by use of the start key 203 even in the audio mode. That is, even in the audio mode as illustrated in FIG. 7A, it is necessary to press the start key 203 after moving your hand away from the numeric keypad having been operated to move the focus, in order to execute copying. Thus, visually impaired users may need to search for the start key 203 after moving their hand away from the hardware numeric keypad 206 to execute copying.

Thus, an example of the operation unit to address an issue and a flowchart of copying to address the issue will be described using FIGS. 8A and 8B.

Figure 8A:
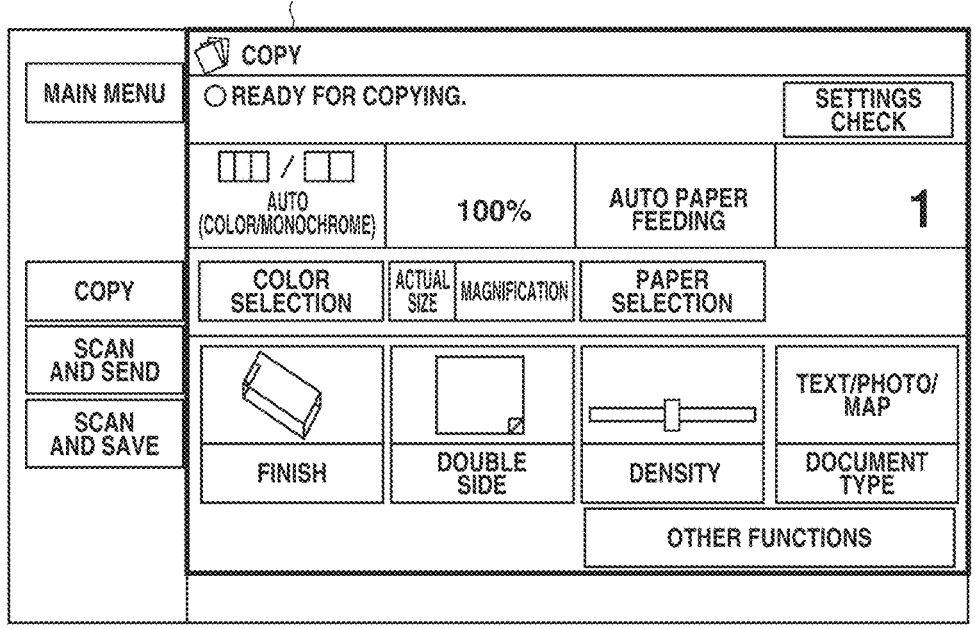
FIGS. 8A and 8B are the operation screen to address an issue and a flowchart of copying to address the issue, respectively.
Figure 8B:
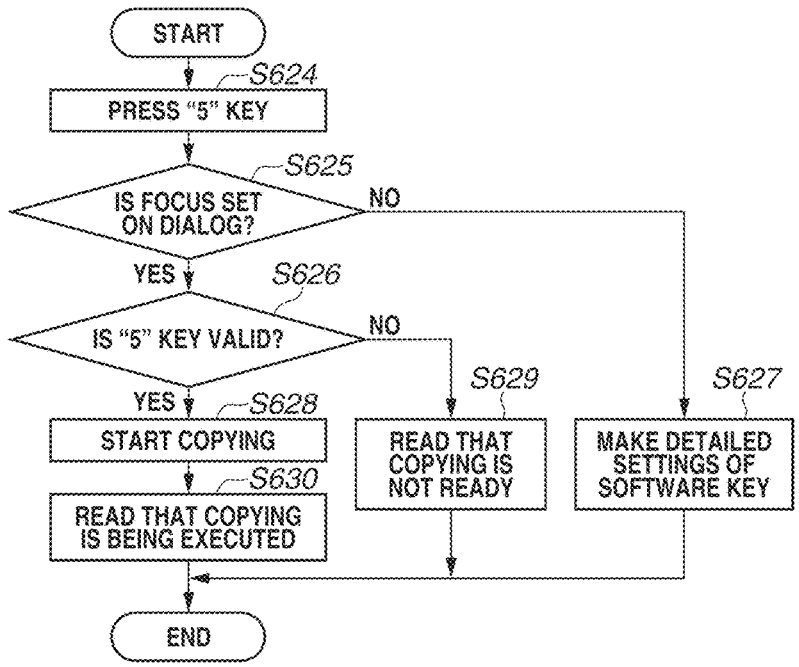

An example of the operation screen in the audio mode of the present embodiment and an example of the flowchart of copy procedures are illustrated using FIGS. 8A and 8B. In the present embodiment, job processing of copying can start upon pressing of the "5" key 2065 while the focus is aligned with none of the software keys 502 to 509 in FIG. 4A. This operation will be described below.

FIG. 8A is an example of the operation screen of the image processing apparatus when copying is performed in the audio mode in the present embodiment. FIG. 8A is an example of the screen when a focus 531 is set on the dialog 512 in the operation screen of FIG. 4A. Here, the configuration in which the position of the focus 531 is aligned with the dialog 512 is illustrated, but the position of the focus only needs to be aligned with an area that does not accept a user's operation. More specifically, for example, the focus may be aligned with the dialog 501 and the message field 510.

In FIG. 8A, the display of the focus 531 on the dialog 512 can be made by superimposing a thick frame for focus display along an outer circumference of the dialog 512 or the display form of the dialog 512 can be changed. Further, a method of displaying the focus for a dialog and a method of displaying the focus for a software key can be made different.

More specifically, for example, when the focus is aligned with a software key, a frame line is superimposed and displayed, and when the focus is aligned with a dialog, the dialog is hatched. Concrete examples are not limited to the above case and the frame line when the focus is aligned with a software key and that when the focus is aligned with a dialog can be different in shape or thickness. Alternatively, the state of the focus can only be stored in the RAM 103 without the focus being displayed in the display unit 121.

The flowchart when job processing of copying is performed in the audio mode in the present embodiment will be described using FIG. 8B.

In step S624, the CPU 101 detects that the "5" key 2065 has been pressed by the user.

In step S625, the CPU 101 determines whether an area aligned with the focus is the dialog 512 through the focus control unit 302. In a case where, as a result of the determination, an area aligned with the focus is the dialog 512 (YES in step S625), the processing proceeds to step S626; otherwise (NO in step S625), the processing proceeds to step S627. When the processing proceeds to step S627, this is a state in which the focus is set on one of the software keys displayed on the screen and which can be pressed.

In step S627, the processing performed when the "5" key 2065 is pressed while the focus is aligned with a software key is illustrated, and detailed settings of the function of the software key aligned with the focus are made. Here, as an example, a case where detailed settings of the color selection 502 are made will be described.

If, at this point, the user presses the "5" key 2065, a detailed dialog (not illustrated) for color selection settings opens just like when the color selection 502 in the screen display unit is pressed. Then, the focus is aligned with the software key displayed in the opened detailed dialog. Detailed settings are made through pressing of the "5" key 2065 while the focus is aligned with the software key displayed in the detailed dialog. The flowchart in this case is similar to that in FIG. 6B.

The software key can be any key other than the color selection 502. Detailed settings of the number of copies can be made after the focus is aligned with, instead of the software key, the number of copies input field. When step S627 is finished, the flowchart in FIG. 8B ends.

A case where, in step S625, a focus target is determined to be a dialog (a case where the focus is determined to be set on none of the software keys displayed on the screen and which can be pressed) will be described.

When the processing proceeds from step S625 to step S626, then in step S626, the CPU 101 determines whether acceptance of a copying start instruction by the "5" key 2065 being pressed is enabled. At this point, the CPU 101 refers to the result of the flowchart performed in FIG. 4B. As the start key 203 is enabled or disabled in FIG. 4B, here, the "5" key 2065 is enabled or disabled. In a case where, as a result of the determination, the "5" key 2065 is enabled (YES in step S626), the processing proceeds to step S628, and in a case where the "5" key 2065 is disabled (NO in step S626), the processing proceeds to step S629.

In step S628, the CPU 101 issues an instruction to start copying to the scanner controller 105 and the printer controller 107. At this point, a document is read by the scanner 106 and image data of the read document is generated before the generated image data is printed by the printer 108. Then, in step S630, the CPU 101 outputs an audio message indicating that printing is being performed, for example, "Copying is being executed" via the speaker 118. After step S630, the flowchart ends.

In step S629, the CPU 101 does not start copying. At this point, the CPU 101 outputs an audio message of contents in accordance with the status of the apparatus like, for example, "Copying is not ready." via the speaker 118. After step S629, the flowchart ends.

The order in which the focus is set to a dialog in step S626 can be the initial position or, as will be described below, the focus may be aligned with the dialog after moving through an operation of the numeric keypad.

That is, as illustrated in FIG. 8B, processing similar to that performed by the start key 203 being pressed can be performed by the "5" key 2065 being pressed while the focus is aligned with the dialog.

Thus, according to the configuration in the present embodiment, copying is executed by the "5" key of the numeric keypad being pressed while the focus is aligned with a non-operation unit. Therefore, there is no need to move your hand away from the numeric keypad when executing copying (performing job processing) in the audio mode. Consequently, it is not necessary for a visually impaired user to search for the start key after moving his/her hand away from the numeric keypad.

Figure 9A:
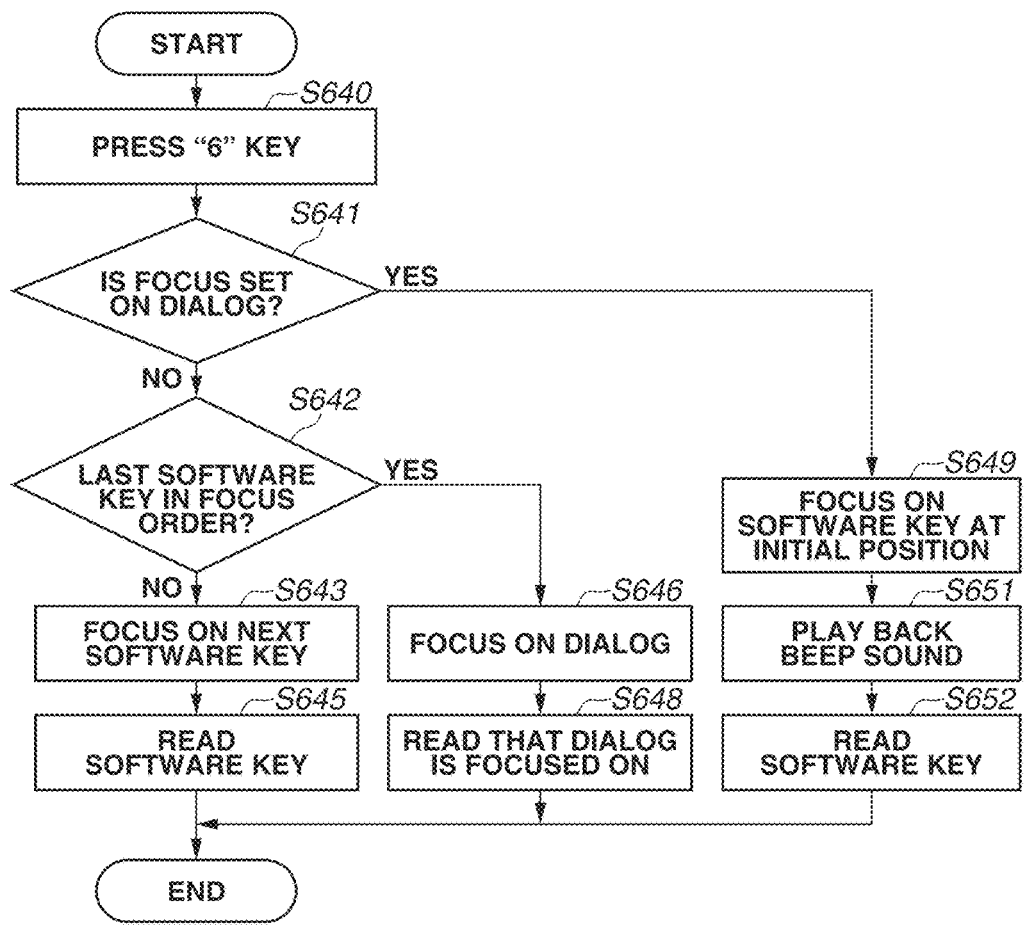
FIGS. 9A and 9B are flowcharts illustrating focus movement methods to set the focus on a dialog.
Figure 9B:
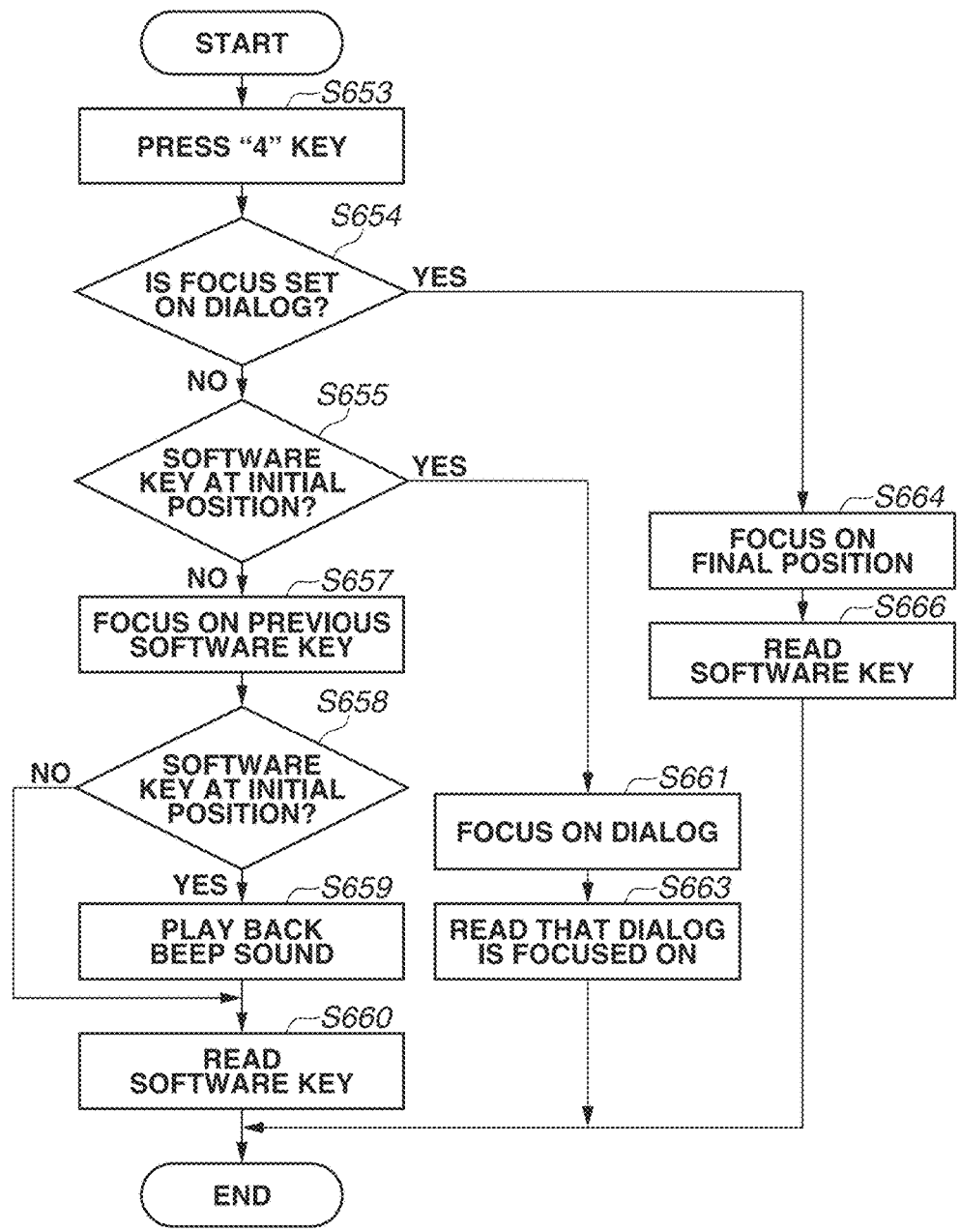

In the present embodiment, FIGS. 9A and 9B illustrate flowcharts illustrating methods of moving the focus to align the focus with a dialog. In FIGS. 9A and 9B, after the movement of the focus to the software keys illustrated in the focus movement table of FIG. 5B is finished, the focus is aligned with the dialog 512. A process of displaying the focus is omitted in the flowcharts of FIGS. 9A and 9B.

In the audio mode, a function of moving the position of the focus is assigned to the "4" key 2064 and the "6" key 2066 of the numeric keypad. The user can move the focus from the state of FIG. 5A to select the dialog 512 in FIG. 8A by pressing the "4" key 2064 or the "6" key 2066 of the numeric keypad at least once.

If the user presses the "6" key 2066 in the present embodiment, the focus moves in the order (to the next one) of the focus movement table 601 in FIG. 5B. If the user presses the "4" key 2064, the focus moves in the reverse order (to the previous one) of the focus movement table 601 in FIG. 5B.

If the user presses the "6" key 2066 while the focus is set on the last software key in the focus order recorded in the focus movement table 601, the focus is aligned with the dialog 512.

Similarly, if the user presses the "4" key 2064 while the focus is set on the first software key in the focus order recorded in the focus movement table 601, the focus is aligned with the dialog 512.

The flowchart when the user presses the "6" key 2066 will be described using FIG. 9A.

In step S640, the CPU 101 detects that the "6" key 2066 has been pressed by the user.

In step S641, the CPU 101 performs processing similar to that in step S625. In a case where, as a result of the determination, the position of the focus before the "6" key 2066 is pressed is at the dialog (YES in step S641), the processing proceeds to step S649; otherwise (NO in step S641, the processing proceeds to step S642).

In step S642, it is determined whether the software key aligned with the focus is the last software key in the focus order illustrated in the focus movement table 601. In a case where the software key is the last software key in the focus order (YES in step S642), the processing proceeds to step S646; otherwise (NO in step S642), the processing proceeds to step S643.

In step S643, the CPU 101 moves the position of the focus from the position of the focus before the "6" key 2066 is pressed to the next software key. Then, in step S645, the CPU 101 performs processing similar to that in step S615 and step S616 of FIG. 6A. When step S645 is finished, the processing performed when the user presses the "6" key 2066 ends.

A specific example of the movement of the focus here will be described. If, for example, the focus is aligned with the color selection 502 before the "6" key 2066 is pressed, the focus is aligned with the magnification 503 as the next software key after the "6" key 2066 is pressed. Thus, the focus on the color selection 502 is deleted and the focus is displayed on the magnification 503.

In step S646, the CPU 101 aligns the focus with the dialog. In step S648, the CPU 101 displays the focus and provides audio guidance of notification about the dialog aligned with the focus in step S646 via the speaker 118. The contents of the notification can only notify that the focus has been aligned with the dialog or can be audio guidance like asking whether to start job processing, for example, "Do you want to start copying?".

The contents of the notification can also be audio guidance explaining which job processing is performed when a hardware key associated with the dialog is pressed. When, for example, the focus is aligned with the dialog 512, the CPU 101 outputs audio guidance like "You can start copying by the "5" key." as audio guidance of job processing associated with the start key 203 from the speaker 118. Further, the result of validation determination processing illustrated in FIG. 4B performed when the start key is pressed, the result being held in the RAM 103, is referred to, and if the "5" key 2065 being pressed is disabled, an audio message "Copying cannot start." can be output.

When step S648 is finished, the processing performed when the user presses the "6" key 2066 ends.

In step S649, the focus is aligned with the dialog before the "6" key 2066 is pressed and, after the "6" key 2066 is pressed, the CPU 101 aligns the focus with the software key at the initial position. Then, the CPU 101 performs processing similar to that in step S706 of FIG. 6B.

In step S651, the CPU 101 outputs a beep sound from the speaker 118. With the beep sound output, the user can know that the focus has been aligned with the initial position. Instead of the beep sound, audio guidance such as "initial focus position" can be output.

In step S652, the CPU 101 performs processing similar to that in step S707 of FIG. 6B. When step S652 is finished, the processing performed when the user presses the "6" key 2066 ends.

The flowchart when the user presses the "4" key 2064 will be described using FIG. 9B.

In step S653, the CPU 101 detects that the "4" key 2064 has been pressed by the user. In step S654, the CPU 101 performs processing similar to that in step S641. In a case where, as a result of the determination, the position of the focus before the "4" key 2064 is pressed is at the dialog (YES in step S654), the processing proceeds to step S664; otherwise (NO in step S654), the processing proceeds to step S655.

In step S655, the CPU 101 determines whether the focus is aligned with the software key at the initial position. In a case where the software key is the software key at the initial position (YES in step S655), the processing proceeds to step S661; otherwise (NO in step S655), the processing proceeds to step S657.

In step S657, the CPU 101 moves the position of the focus from the position of the focus before the "4" key 2064 is pressed to the previous software key in the focus order illustrated in the focus movement table 601. Also, in step S657, the CPU 101 performs processing similar to that in step S615 of FIG. 6A.

Here, a specific example of the movement of the focus will be described. If, for example, the focus is set on the color selection 502 before the "4" key 2064 is pressed, after the "4" key 2064 is pressed, the focus is displayed on the dialog.

In step S658, the CPU 101 determines whether the software key aligned with the focus in step S657 is the software key at the initial position recorded in the focus movement table 601. In a case where the software key aligned with the focus is the software key at the initial position (YES in step S658), the processing proceeds to step S659; otherwise (NO in step S658), the processing proceeds to step S660.

Then, in step S659, the CPU 101 performs processing similar to that in step S651 of FIG. 9A. In step S660, the CPU 101 performs processing similar to that in step S652.

When step S660 is finished, the processing performed when the user presses the "4" key 2064 ends.

In step S661, the CPU 101 aligns the focus with the dialog, and, in step S663, the CPU 101 performs processing similar to that in step S647 and step S648. When step S663 is finished, the processing performed when the user presses the "4" key 2064 ends.

In step S664, the focus is set on the dialog before the "4" key 2064 is pressed, and the display of the focus on the dialog is deleted by the "4" key 2064 being pressed. Then, the focus is set on the software key at the final position in the focus order recorded in the focus movement table 601.

In step S666, the CPU 101 performs processing similar to that in step S643 and step S645 of FIG. 9B. When step S666 is finished, the processing performed when the user presses the "4" key 2064 ends.

According to the present embodiment, as described above, the user of the image processing apparatus can perform a similar operation to that performed when the start key 203 is pressed, by pressing the "5" key 2065 while the focus is set on the dialog. Further, the user of the image processing apparatus can align the focus with the dialog by operating the "4" key 2064 and the "6" key 2066 to move the focus.

According to the above configuration, the user can obtain a processing result equivalent to that obtained when the start key 203 is pressed, without moving the position of his/her hand away from the hardware numeric keypad 206.

In the present embodiment, the initial position of the focus (the focused position in step S614) when the audio mode starts is preferably not a dialog. For example, as described above, the initial position of the focus is set to the color selection 502. This makes it possible to reduce the possibility of starting job processing immediately after opening the dialog or starting the audio mode by the "5" key 2065 being mistakenly pressed by the user.

The order in which the focus is set on the dialog in the present embodiment may be the position on which the focus is set when the "4" key 2064 or the "6" key 2066 is pressed once from the initial position of the focus. In this manner, the user can start copying by pressing the "4" key 2064 or the "6" key 2066 and then the "5" key 2065, while the focus is positioned at the initial position immediately after the audio mode starts. Copying can start with the minimum number of operation steps while the above operating error is prevented.

In the present embodiment described above, the dialog is not included in the focus order recorded in the focus movement table 601, and the focus is aligned with the dialog in the flowchart. In contrast, the focus order recorded in the focus movement table 601 can include a dialog. In that case, the order of the dialog in the focus movement table 601 is preferably the last. In this case, the user starts copying by pressing the "4" key 2064 and then the "5" key 2065. Accordingly, as described above, copying can start with the minimum number of operation steps while the operating error is prevented.

In the audio mode, the CPU 101 assigns a function of the start key to the "5" key 2065. Further, the CPU 101 assigns a function of moving the focus (to the next one) in the order to the "6" key 2066 and a function of moving the focus (to the previous one) in the reverse order to the "4" key 2064. However, the present embodiment is not limited to such an example and each function can be assigned to other hardware keys included in the hardware numeric keypad 206.

An example of performing job processing of copying by the image processing apparatus in the present embodiment has been described, but the present embodiment can also be applied to a case where job processing of scanning that reads a document and sends image data of the read document is performed.

An image processing apparatus according to a second embodiment will be described using FIGS. 10A to 10C. FIG. 10A illustrates a focus movement table in the present embodiment, FIG. 10B illustrates a correspondence table between the dialog on which the focus is to be set and processing contents in the present embodiment, and FIG. 10C illustrates a flowchart of processing corresponding to the dialog on which the focus is to be set in the present embodiment. The same reference numerals are assigned to portions having functions similar to those in FIGS. 1 to 9B and a detailed description thereof is omitted.

In the present embodiment, job processing performed when the "5" key 2065 is pressed while the focus is aligned with a non-operation unit other than the dialog described in the first embodiment will be described.

An focus movement table 902 used in the present embodiment is illustrated in FIG. 10A. The focus movement table 902 is different from the focus movement table 601 in that a plurality of non-operation screens (for example, the dialog 501 and the message field 510) is included in the focus movement order. As in the first embodiment, no non-operation screen can be included in the focus movement order. In that case, after the focus moves according to the order of the focus movement table, the CPU 101 moves the focus according to a program read from the HDD 110.

In FIG. 10B, the correspondence table of processing performed when the "5" key 2065 is pressed while the focus is aligned with each of the plurality of non-operation screens is illustrated.

In the present embodiment, the job processing is performed by the "5" key 2065 being pressed while the focus is aligned with the dialog 501 or the dialog 512. Here, the job processing is, for example, the start of copying.

Processing different from the job processing is performed by the "5" key 2065 being pressed while the focus is aligned with the message field 510. The different processing is, for example, a reset. The reset is to clear job settings that have been set until then using the setting screen to restore the initial state. Further, the processing (reset) different from the job processing is performed by the "5" key 2065 being pressed while the focus is aligned with the detailed dialog displayed when each software key is pressed.

In the present embodiment, an example of starting copying and triggering a reset is illustrated in FIG. 10B, but the processing contents can be others than the above examples.

The job processing or processing different from the job processing performed when the "5" key 2065 is pressed while the focus is set on each non-operation screen is not necessarily limited to the processing contents illustrated in FIG. 10B.

The flowchart in the present embodiment will be described using FIG. 10C. In step S801, the CPU 101 detects that the "5" key 2065 has been pressed by the user. In step S802, the CPU 101 determines whether an area aligned with the focus is a software key.

In a case where, as a result of the determination, the area aligned with the focus is a software key (YES in step S802), the processing proceeds to step S805; otherwise (NO in step S802), the processing proceeds to step S803. Whether the area is a software key is determined based on the type. For example, keys and the numeric value input field are determined to be operable software keys, and the above non-operation unit is determined to be inoperable.

In step S803, the CPU 101 refers to a correspondence table 903 of the software keys and the hardware keys to acquire processing contents corresponding to the software key aligned with the focus. If, for example, the area aligned with the focus is a dialog, job processing of copying is performed. If the area aligned with the focus is the message field 510, reset processing is performed. If the area aligned with the focus is the detailed dialog of the color selection 502, reset processing is performed.

In step S804, processing of the processing contents acquired in step S803 is executed. If the processing contents correspond to the start, the CPU 101 performs processing similar to the processing in steps S626 and S628 to S630 of FIG. 8B. If the corresponding job processing is the reset, the CPU 101 performs the same processing as that when the reset key 205 is pressed. After step S804, the flowchart in FIG. 10C ends.

In step S805, the CPU 101 performs processing similar to that in step S627 of FIG. 8B. According to the present embodiment, different processing contents can be assigned to each of a plurality of non-operation units. Accordingly, for a plurality of hardware keys (for example, the reset key 205 and the start key 203) arranged in the operation unit 120, processing results equivalent to those obtained when various hardware keys are pressed can be obtained without significantly moving a hand position from the hardware numeric keypad 206.

In the present embodiment, the correspondence table 903 illustrated in FIG. 10B can be modified if appropriate. Accordingly, the processing to be performed when the "5" key 2065 is pressed while the focus is aligned with a non-operation screen can flexibly be switched for each displayed screen.

In the audio mode in which guidance is provided, job processing can easily be executed without the need to search for the start key before execution of the job processing.

In the mode in which audio guidance is provided, the user needs to press the start key after moving his/her hand away from the numeric keypad to execute job processing. According to the present embodiment, however, the need for a visually impaired user to search for the start key after moving his/her hand away from the numeric keypad is eliminated.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions.

While the present disclosure has been described with reference to embodiments, it is to be understood that the disclosed information is not limited to the disclosed embodiments. The scope of the following claims is to be accorded the broadest interpretation so as to encompass all such modifications and equivalent structures and functions.

This application claims the benefit of Japanese Patent Application No. 2017-072920, filed Mar. 31, 2017, which is hereby incorporated by reference herein in its entirety.

What is claimed is:

1. A job processing apparatus comprising:
a hardware numeric keypad at least including a first hardware key and a second hardware key;
a touch panel display device;
at least one processor; and
at least one memory storing instructions that, when executed by the at least one processor, causing the job processing apparatus to perform operations including:
displaying, on the touch panel display device, an operation screen that includes at least a plurality of display items for accepting an operation that relates to execution of a job,
outputting, in response to setting a focus on one of the plurality of display items displayed on the touch panel display device, an audio guidance for the one display item on which the focus has been set,
moving a target of the focus based on selection of the first hardware key, and
executing the job at least based on detecting pressing of the second hardware key in a state in which the focus is not set on any of the plurality of display items.

2. The job processing apparatus according to claim 1, wherein executing the instructions further performs operations including executing the job at least based on detecting pressing of the second hardware key in a state in which the focus is set on an area that is different from an area where the plurality of display items is displayed.

3. The job processing apparatus according to claim 2, wherein, on the operation screen, the area where the focus is set is displayed distinguishably from an area where the focus is not set.

4. The job processing apparatus according to claim 2, wherein executing the instructions further performs operations including outputting an audio guidance that relates to execution of the job in response to setting a focus on the area that is different from the area where the plurality of display items is displayed.

5. The job processing apparatus according to claim 2, wherein the area that is different from the area where the plurality of display items is displayed is a component area that contains the plurality of display items.

6. The job processing apparatus according to claim 1, further comprising a storage device configured to store an order of movement of the focus,
wherein the hardware numeric keypad further includes a third hardware key,
wherein a position of the focus moves in a first order by the first hardware key being pressed, and
wherein the position of the focus moves in a second order which is reverse order to the first order by the third hardware key being pressed.

7. The job processing apparatus according to claim 1, further comprising a printing device configured to print an image on a sheet,
wherein the job is a print job for printing the image on the sheet using the printing device.

8. The job processing apparatus according to claim 1, further comprising a scanner device configured to read an image of a document,
wherein the job is a transmission job for transmitting data based on the image obtained by reading the document using the scanner device.

9. The job processing apparatus according to claim 1,
wherein executing the instructions further performs operations including determining whether the job is executable or not, and
wherein, in a case where it is determined that the job is not executable, executing includes not executing the job even if the pressing of the second hardware key is detected in the state in which the focus is not set on any of the plurality of display items.

10. The job processing apparatus according to claim 1, wherein, on the operation screen, a plurality of display items for setting the job is displayed, and a display item for causing execution of the job is not displayed.

11. The job processing apparatus according to claim 1, wherein executing the instructions further performs operations including performing, if the pressing of the second hardware key is detected in the state in which the focus is set on any of the plurality of display items, a process corresponding to the one display item in which the focus is set.

12. A method of controlling a job processing apparatus having a hardware numeric keypad at least including a first hardware key and a second hardware key, and a touch panel display device, the method comprising:
displaying, on the touch panel display device, an operation screen that includes at least a plurality of display items for accepting an operation that relates to execution of a job;
outputting, in response to setting a focus on one of the plurality of display items displayed on the touch panel display device, an audio guidance for the one display item on which the focus has been set;
moving a target of the focus based on selection of the first hardware key; and
executing the job at least based on detecting pressing of the second hardware key in a state in which the focus is not set on any of the plurality of display items.

13. A non-transitory computer-readable storage medium storing a program to cause a computer to perform a method of method of controlling a job processing apparatus having a hardware numeric keypad at least including a first hardware key and a second hardware key, and a touch panel display device, the method comprising:
displaying, on the touch panel display device, an operation screen that includes at least a plurality of display items for accepting an operation that relates to execution of a job;
outputting, in response to setting a focus on one of the plurality of display items displayed on the touch panel display device, an audio guidance for the one display item on which the focus has been set;
moving a target of the focus based on selection of the first hardware key; and
executing the job at least based on detecting pressing of the second hardware key in a state in which the focus is not set on any of the plurality of display items.

* * * * *